UNITED STATES PATENT OFFICE.

JOHN GUSTAF ADOLF RHODIN, OF LONDON, ENGLAND.

MANUFACTURE OF SLAG CEMENT.

1,017,912.      Specification of Letters Patent.      Patented Feb. 20, 1912.

No Drawing.      Application filed February 23, 1910. Serial No. 545,552.

*To all whom it may concern:*

Be it known that I, JOHN GUSTAF ADOLF RHODIN, a subject of the King of Sweden, residing at No. 39 Grasmere road, Muswell Hill, London, Middlesex county, England, have invented certain new and useful Improvements in the Manufacture of Slag Cement, of which the following is a full, clear, and exact description.

It is well known that blast furnace slag may be transformed in various ways to produce a substance similar to Portland cement.

The present process relates to a treatment of slag at a moderate temperature, viz. 900° C. approximately, to produce cement. If molten slag be granulated in connection with this invention no production of any effect is attempted on the molten slag itself, the operations under the present invention beginning when the slag has cooled to the above mentioned temperature.

The essence of the present invention is a chemical treatment independent of any special form of apparatus. Any means of finely dividing slag and of keeping it at the above mentioned temperature during the herein described treatment will suit my purpose. I have discovered that it is possible to have a silicate react vigorously with lime and common salt at this temperature without the slightest sign of fusion, and that considerable quantities of lime will enter into chemical combination with the silicate under these conditions.

One of the objects of the present invention is to chemically combine lime with blast furnace slag without sintering or fusion. Several other effects are, however, necessary in order to produce a completely satisfactory cement from blast furnace slag. No process described so far in the art, except actual clinkering with lime to Portland cement, has been quite satisfactory, as one or more necessary operations or additions has always been omitted.

My invention relates to:—1°. The temperature, at which the action takes place. 2°. The composition of the atmosphere in which the action takes place. 3°. The incorporation of lime into chemical combination with slag without fusion, or sintering. 4°. The use of a contact substance for facilitating object 3°. 5°. The use of the other contact substance for improving the hydraulic properties of the resulting cement. 6°. The use of a third contact substance for rendering the initial "setting" of the cement a permanent quality, and to make the cement store without alteration. 7°. The combination of these effects in one operation.

The most favorable temperature lies at about 900° C. With regard to the atmosphere employed, it must be of such character as to remove the bulk of sulfur, occurring as sulfids in the slag, in the form of sulfurous acid instead of leaving it behind as gypsum in the cement, which is the main effect of oxidation in air. For this purpose I use an atmosphere of air and steam in admixture. In many known processes such an atmosphere occurs, but its adjustment for this specific purpose is not described, and the arrangements are such as to make the action more or less incomplete and unessential, and the effect is neither claimed nor indicated. In experiments to elucidate the magnitude of the sufur-removing action, I treated a slag, containing 2.53% of sulfur: (*a*) by oxidation in air in an open muffle; and also (*b*) by oxidation in a mixed atmosphere of steam and air in the same muffle. The resulting product from (*a*) contained 2.20% of sulfur, showing a nearly complete conversion into calcium sulfate. The product from (*b*) contained 0.84% total sulfur only, showing a removal of nearly 70% of the sulfur. A visual effect of treatment (*b*) under the conditions of the experiment was the burning of the sulfureted hydrogen with a flame at the muffle door. Calcium sulfate is undesirable in a cement in large proportions on account of its retarding influence upon the setting time. To elucidate this, I made two lots of cement according to my complete process: (*a*) in an atmosphere of air only, and also (*b*) in a mixed atmosphere of air and steam. Cement (*a*) set to British standard in two hours, but (*b*) set in less than 10 minutes. As it is absolutely necessary for harbor work to have a cement setting in ½ hour or less, and as no cement, containing a large percentage of calcium sulfate will do this, combustion in a mixed atmosphere of air and steam is very advantageous in my process.

When incorporating lime in chemical combination into silicates at roughly 900° C., I have found the alkaline chlorids or calcium chlorid to be the most effective contact substances or reaction accelerants. A small percentage, say from 1 to 1½ per cent.

of common salt, mixed with finely divided blast furnace slag and lime, causes the slag to combine chemically with surprisingly large quantities of lime at the low temperature of 900° C. Simultaneously the slag becomes soluble in acid, but the hydraulic properties still leave a great deal to be desired. To improve these qualities a sulfate salt of the type of magnesium-sulfate or ferrous sulfate may be used in connection with the common salt. The quantity must be less than 2.5 per cent. of the whole, as large additions make the cement unsound. But this addition while advantageous for its designated purpose, without other measures gives a cement which is unsatisfactory, e. g., it loses its cementing properties at an alarming rate, in fact it ceases to be a cement in a very few days. The object of such an addition in as far as the present invention is concerned is to increase the speed of the after hardening in water, and for this purpose it is useful, but for certain purposes it may be omitted.

To make the cement keep, I have found an addition of aluminate of lime, or a mixture yielding aluminate of lime absolutely essential. Aluminium salts *per se* are not quite good for a dry process of producing cement, as the only one which is commercially possible, viz., crude aluminium sulfate cannot be powdered alone to a satisfactory fineness for admixture with fine cement materials. If this salt is chosen, however, I may mix it with slaked lime in a suitable mill, whereby a perfectly dry powder is produced, which contains the elements of calcium aluminate. I may also take natural bauxite as a raw material to be admixed with lime in a similar manner. With this addition to my mixture, and treatment at 900° C. in a mixed atmosphere of air and steam, I have produced cement, keeping its properties for a practically indefinite period. Tensile tests with a week's interval came out almost identical. The object of this invention is therefore to combine in a single operation several chemical actions which affect the various properties of a blast furnace slag cement formed at about 900° C. without fusion or sintering so as to make a high grade hydraulic cement, which will store well, and the properties of which can be varied at will to suit various purposes in the manner specified above. The process is specially adapted for treating so called steel pig slags, containing about 40 per cent. of lime, by effecting the chemical combination of extra lime at a low temperature, whereby a normal hydraulic increase of strength with time is obtained without resort having to be taken to the expensive clinkering process.

In operation I proceed as follows:—A certain quantity of finely divided slag is introduced into a furnace, which may be rotary. The slag may come hot from a granulator or atomizer of any construction, or it may be produced by finely subdividing already cold slag. Either before or after its introduction the fine slag is mixed intimately with the following chemicals: (1) a suitable quantity of finely divided lime, (2) a lime incorporating and reaction accelerating substance such as an alkaline chlorid or calcium chlorid, (3) if necessary, a small quantity of sulfate of iron or one of the alkaline earths, (4) a suitable quantity of a substance yielding calcium aluminate at 900° C. In the furnace, the charge is kept at a temperature of approximately 900° C., while a current of air and steam is passed over the same continuously. When the evolution of sulfur dioxid ceases, the charge is taken out and cooled. If necessary, it is then ground to flour, when it forms a marketable cement. Sometimes it may be found advantageous to grind the charge preliminarily to form a flour, and then no further grinding will be necessary.

With regard to quantities of chemicals I have found that an ordinary white pig slag containing 43 per cent. of lime (CaO) yielded a really high class cement when treated at 900° C. in the following mixture:—100 parts of slag, 22.5 parts of lime (CaO), 0.75 parts of common salt (NaCL), 0.75 parts of crystallized magnesium sulfate, 1.5 parts of commercial crude aluminium sulfate containing 50 per cent. of water. The proportions will naturally be varied according to the composition of the slag and the above is given as an example only. In this case practically the whole of the lime entered into chemical combination with the rest of the mixture, the gaged cement showing even less sweating of lime than Portland cement under similar conditions. The soundness of the cement was so great that the Le Chatelier test failed to give any indication whatever. The setting time could be varied from "fast" to "medium" and "slow" by varying the proportion of steam in the atmosphere.

Having now described the process in detail what I claim is:—

1. In the manufacture of slag cement, the improvement which comprises incorporating suitable quantities of finely divided lime in chemical composition with solid finely divided blast furnace slag at a temperature below that at which any substantial fusion or sintering takes place and at about 900° C. by means of a suitable contact substance such as salt.

2. In the manufacture of slag cement, the improvement which comprises causing the chemical combination of finely divided lime with solid finely divided blast furnace slag at a temperature of about 900° C. by means of a suitable contact substance, while simultaneously removing sulfur in a volatile form from the blast furnace slag by providing a mixed atmosphere of steam and air.

3. In the manufacture of slag cement, the improvement which comprises causing the chemical combination of finely divided lime with solid finely divided blast furnace slag at a temperature of about 900° C. by means of a suitable contact substance, while improving the hydraulic properties of the resulting slag by simultaneously treating with a finely divided sulfate salt.

4. In the manufacture of slag cement, the improvement which comprises causing the chemical combination of finely divided lime with solid finely divided blast furnace slag at a temperature of about 900° C. by means of a suitable contact substance, improving the hydraulic properties of the resulting slag by simultaneously treating with a finely divided sulfate salt, and simultaneously removing sulfur in a volatile form from the blast furnace slag by providing a mixed atmosphere of steam and air.

5. The improvement in the manufacture of slag cement, which comprises chemically combining quantities of finely divided lime with finely divided blast furnace slag at a temperature of 900° C. by means of a suitable contact substance, and at the same time rendering the hydraulic properties of the hydraulic cement permanent by the addition of a finely divided mixture which will yield calcium aluminate at approximately the herein stated temperature.

6. The improvement in the manufacture of slag cement, which comprises chemically combining quantities of finely divided lime with finely divided blast furnace slag at a temperature of 900° C. by means of a suitable contact substance, rendering the hydraulic properties of the hydraulic cement permanent by the addition of a finely divided mixture which will yield calcium aluminate at approximately the herein stated temperature, and simultaneously removing the sulfur in a volatile form from the blast furnace slag by providing a mixed atmosphere of steam and air, said steps being carried out in a single treatment in a furnace.

7. In the manufacture of slag cement, the method which comprises placing in a furnace a mixture containing finely divided slag and finely divided lime, a lime-incorporating substance, such as a chlorid, sulfate of iron, and a substance capable of yielding calcium aluminate at a temperature of approximately 900° C., and keeping the charge at a temperature of approximately 900° C., and at the same time passing a current of air and steam continuously over the charge.

8. In the manufacture of slag cement, the method which comprises placing in a furnace a mixture containing finely divided blast furnace slag, finely divided lime, a lime incorporating substance such as a chlorid, sulfate of iron and a substance capable of yielding calcium aluminate, maintaining such charge at a temperature of approximately 900° C., while simultaneously passing a current of air and steam over the mixture, the treatment being continued until the evolution of sulfur dioxid practically ceases, and then removing the charge; substantially as described.

In testimony whereof I have signed my name to this specification in the presence of two subscribing witnesses.

JOHN GUSTAF ADOLF RHODIN.

Witnesses:
HERBERT D. JAMESON,
RIPLEY WILSON.